US012669223B1

(12) United States Patent
Wang

(10) Patent No.: US 12,669,223 B1
(45) Date of Patent: Jun. 30, 2026

(54) SEALED AND WATERPROOF HIGH-POWER SHOCK-RESISTANT BULB

(71) Applicant: Dongguan Huanhui Technology Co., Ltd., Dongguan City (CN)

(72) Inventor: Wei Wang, Dongguan City (CN)

(73) Assignee: Dongguan Huanhui Technology Co., Ltd., Dongguan City (CN)

( * ) Notice: Subject to any disclaimer, the term of this patent is extended or adjusted under 35 U.S.C. 154(b) by 0 days.

(21) Appl. No.: 19/542,277

(22) Filed: Feb. 17, 2026

(30) Foreign Application Priority Data

Dec. 22, 2025 (CN) ........................ 202522716607.6

(51) Int. Cl.
*F21K 9/00* (2016.01)
*F21K 9/232* (2016.01)
*F21K 9/237* (2016.01)
*F21K 9/238* (2016.01)
*F21V 31/00* (2006.01)

(52) U.S. Cl.
CPC .............. *F21K 9/232* (2016.08); *F21K 9/237* (2016.08); *F21K 9/238* (2016.08); *F21V 31/005* (2013.01)

(58) Field of Classification Search
CPC ........ F21V 31/005; F21K 9/232; F21K 9/238; F21K 9/237
See application file for complete search history.

(56) References Cited

U.S. PATENT DOCUMENTS

| | | | | |
|---|---|---|---|---|
| 6,786,625 B2 * | 9/2004 | Wesson | .................. | F21K 9/238 362/548 |
| 10,240,724 B2 * | 3/2019 | Jiang | ...................... | F21K 9/232 |
| 10,571,101 B2 * | 2/2020 | Erdener | .................. | F21V 21/26 |
| 2025/0132144 A1 * | 4/2025 | Chen | ........................ | H01K 5/00 |

* cited by examiner

*Primary Examiner* — Gerald J Sufleta, II
(74) *Attorney, Agent, or Firm* — AVEK IP, LLC

(57) ABSTRACT

Some embodiments of the disclosure provide a sealed and waterproof high-power shock-resistant bulb. In some examples, the sealed and waterproof high-power shock-resistant bulb includes a bulb shell and a light-emitting assembly. In other examples, by additionally disposing an expansion capacitor in the bulb, the light-emitting assembly may change the light-emitting power of a light-emitting diode (LED) lamp group according to an input voltage. The LED lamp group is composed of a plurality of obliquely dislocated LED light bars, such that the bulb may generate a luminous brightness with higher lumens. The bulb and a plug socket are both made of a plastic material, such that the sealed and waterproof high-power shock-resistant bulb is low in manufacturing cost, good in sealing effect, and waterproof and shock-resistant.

10 Claims, 6 Drawing Sheets

SEALED AND WATERPROOF HIGH-POWER SHOCK-RESISTANT BULB

CROSS REFERENCE TO RELATED APPLICATION

This application claims priority to Chinese patent application number 2025227166076, filed on Dec. 22, 2025, the disclosure of which is incorporated by reference herein in its entirety.

FIELD OF THE DISCLOSURE

The disclosure relates to the technical field of luminaires and discloses a sealed and waterproof high-power shock-resistant bulb.

BACKGROUND

With the popularization and development of power technology, luminaires have become an indispensable lighting tool in people's daily lives. Conventional incandescent lamps and energy-saving lamps have been gradually replaced by high-efficiency and energy-saving LED luminaires. However, existing LED luminaires still have certain limitations in terms of functionality and applicability. Existing high-power bulbs for lighting are usually made of glass materials, such as the bulb disclosure in Chinese Patent No. CN222503570U, and such bulbs are fragile and prone to damage from knocks and collisions. Most LED bulbs have fixed brightness, and the luminous power of the bulbs is controlled at a specified value via components such as a constant current driver. For example, the power of bulbs for household lighting is usually 6 W-9 W: about 450-800 lumens, and higher power of bulbs is usually 10-13 W: 800-1100 lumens. The power and light intensity of such bulbs cannot be flexibly adjusted according to actual demands generally, making it difficult to meet the usage requirements of diverse scenarios, such as home atmosphere creation, commercial place lighting and light control for special occasions. In view of this, the inventor(s) has/have made a new invention.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a sealed and waterproof high-power shock-resistant bulb provided by the present disclosure includes a bulb and a light-emitting assembly, where the bulb shell is made of a plastic material and is provided with a bayonet socket;

the light-emitting assembly is provided with a plug socket and an LED lamp group, where a stem capable of being placed in the bulb shell is disposed at a front end of the plug socket, the LED lamp group is fixedly connected to the stem, a rear end of the plug socket is capable of being connected to the bayonet socket and is provided with an accommodating cavity, an electrical connection plate is disposed in the accommodating cavity, a sealant groove is reserved in the accommodating cavity, and the sealant groove is filled with a sealant, such that the electrical connection plate is hermetically isolated from the outside;

the plug socket is provided with a wire hole capable of accommodating a plurality of wires, and a wire of the LED lamp group is electrically connected to the electrical connection plate via the wire hole; and the electrical connection plate is provided with an expansion capacitor and a control chip, the electrical connection plate is provided with a first wire and a second wire that are connected to an external power supply, and the control chip and the expansion capacitor are capable of adjusting output power of the LED lamp group according to magnitudes of voltages output by the first wire and the second wire, so as to change light emission of the LED lamp group.

In some embodiments, a lamp base is disposed outside the bayonet socket, and the first wire and the second wire are electrically connected to two electrodes of the lamp base, respectively.

Optionally, the bulb shell is filled with inert gas.

In some other embodiments, a threaded portion is disposed outside the bayonet socket, and the plug socket is provided with a step portion abutting against a port of the bayonet socket.

Optionally, the LED lamp group is provided with a plurality of LED light bars and a third wire and a fourth wire that are connected to the light bars, the third wire passes through the wire hole and is electrically connected to the electrical connection plate, the fourth wire is connected in series to the plurality of LED light bars, and a wiring groove capable of positioning the fourth wire is formed in a tail end of the stem.

In some embodiments, a protruding bump is disposed at the tail end of the stem, and the bump is thermally deformable.

Optionally, two groups of the LED lamp groups are disposed, each group of the LED lamp groups is provided with two LED light bars, a third wire that is connected to the electrical connection plate is disposed at one end of each of the LED light bars, and a fourth wire that electrically connect the two LED light bars is disposed at the other end of each of the LED light bars.

In some other embodiments, the plug socket is provided with a positioning block, and two wire holes are formed and penetrate through the positioning block.

Optionally, the LED lamp group is provided with a plurality of LED light bars, the LED light bars are disposed around the stem at equal intervals, and relative to the stem, each of the LED light bars is obliquely disposed.

In some embodiments, the wire hole is compressible to narrow, so that the wires of the LED lamp group are relatively fixed with the wire hole.

Optionally, the expansion capacitor is disposed on an upper side surface of the electrical connection plate, a support wire is disposed between the expansion capacitor and the electrical connection plate, and the control chip is disposed on a lower side surface of the electrical connection plate.

Figure 1:
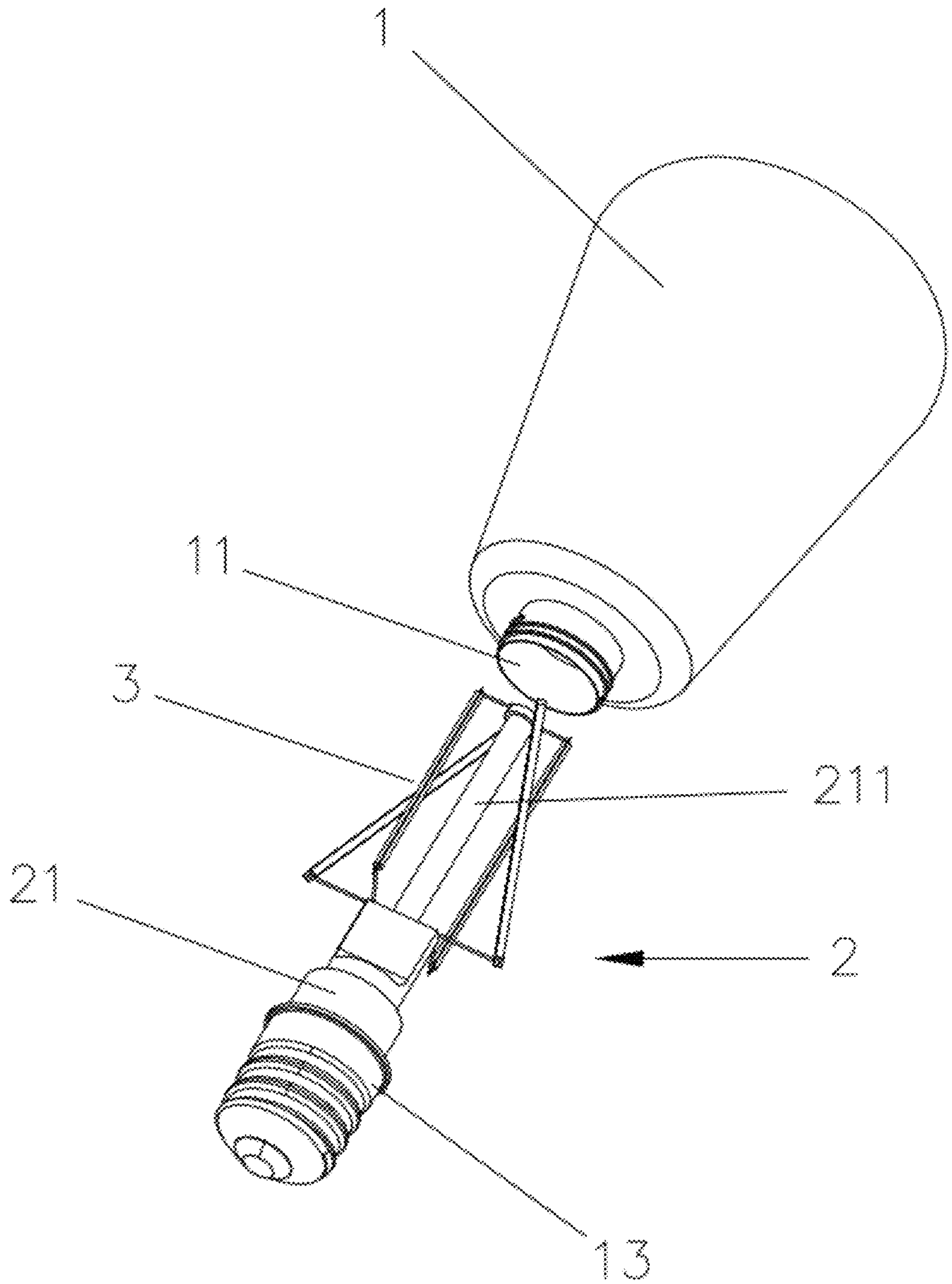
FIG. 1 shows an exploded schematic structural diagram of a bulb according to an embodiment of the disclosure.
Figure 2:
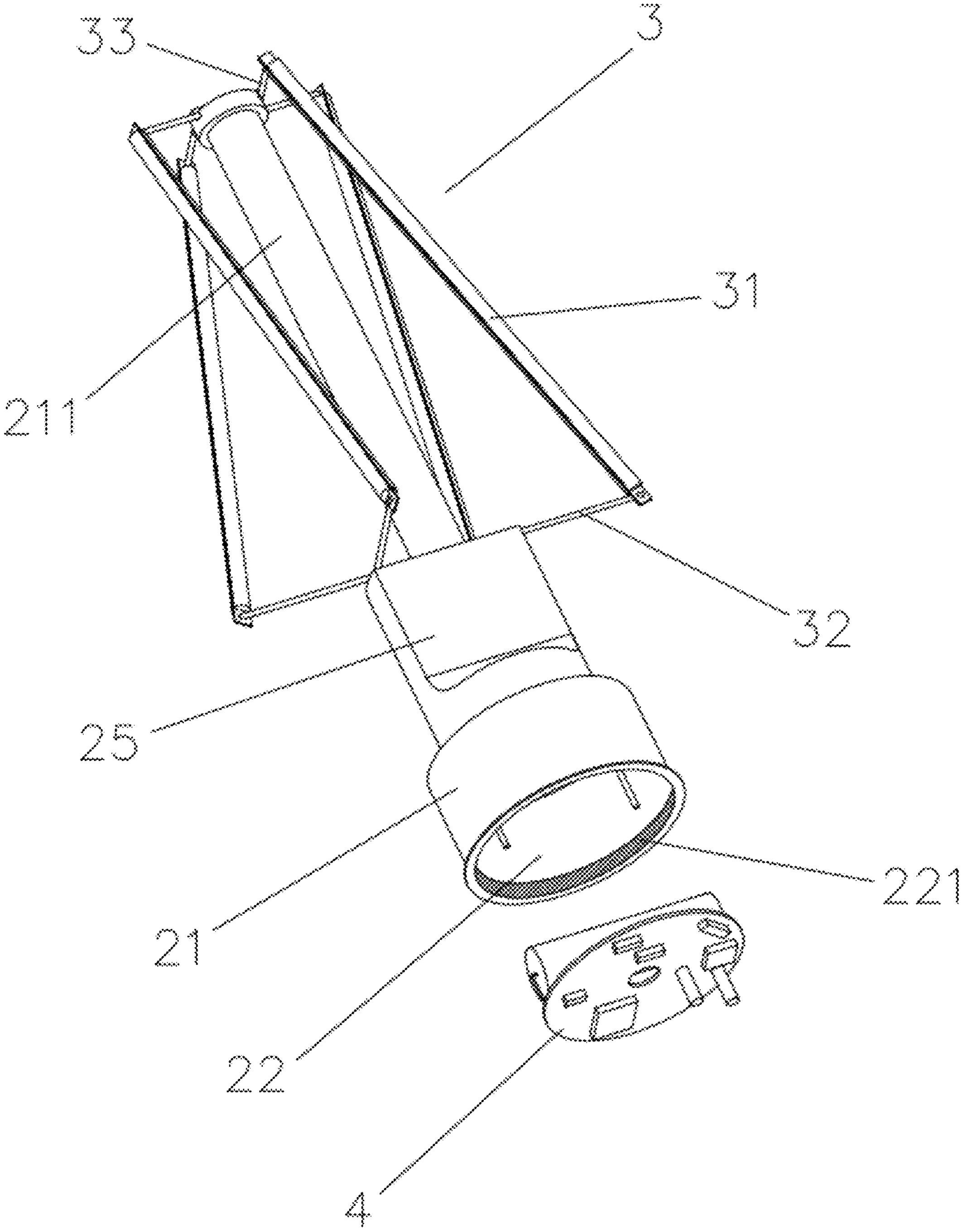
FIG. 2 shows a schematic structural diagram of a light-emitting assembly according to an embodiment of the disclosure.

Reference numerals: 1, bulb shell; 11, bayonet socket; 12, threaded portion; 13, lamp base; 2, light-emitting assembly; 21, plug socket; 211, stem; 212, wiring groove; 213, bump; 22, accommodating cavity; 221, sealant groove; 23, wire hole; 24, step portion; 25, positioning block; 3, LED lamp group; 31, LED light bar; 32, third wire; 33, fourth wire; 4, electrical connection plate; 41, expansion capacitor; 42, control chip; 43, first wire; 44, second wire; and 45, support wire.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

The disclosure will be described in detail below in conjunction with FIGS. 1-6.

A sealed and waterproof high-power shock-resistant bulb provided by the disclosure may include a bulb 1 and a light-emitting assembly 2, where the bulb shell 1 is made of a plastic material and is provided with a bayonet socket 11, the bayonet socket 11 is an open end of the bulb shell 1 and protrudes by a certain length, and the light-emitting assembly 2 is placed in the bulb shell 1 from the bayonet socket 11.

The light-emitting assembly 2 is provided with a plug socket 21 and an LED lamp group 3, where a stem 211 capable of being placed in the bulb shell 1 is disposed at a front end of the plug socket 21, the LED lamp group 3 is fixedly connected to the stem 211, a rear end of the plug socket 21 is capable of being connected to the bayonet socket 11 and is provided with an accommodating cavity 22, the accommodating cavity 22 has an open end, an electrical connection plate 4 is disposed in the accommodating cavity 22, a sealant groove 221 is reserved near the open end on an inner wall of the accommodating cavity 22, and the sealant groove 221 is filled with a sealant, such that the electrical connection plate 4 is hermetically isolated from the outside. The plug socket 21 and the stem 211 are made of a plastic material, the same as the bulb shell 1, such that the bulb is shock and impact resistant, small in weight, and low in manufacturing cost. After being placed into the accommodating cavity 22, the electric connection plate 4 sinks to a certain depth, such that the electric connection plate 4 is located at the sealant groove 221 or pass through the sealant groove 221. After the accommodating cavity 22 is filled with a sealant, the open end of the accommodating cavity 22 may be sealed to prevent water vapor from entering the bulb shell 1 via the wire hole 23 below, with a good waterproof effect.

The plug socket 21 is provided with a wire hole 23 capable of accommodating a plurality of wires, and a wire of the LED lamp group 3 is electrically connected to the electrical connection plate 4 via the wire hole 23.

Specifically, the plug socket 21 is provided with a positioning block 25, and two wire holes 23 are formed and penetrate through the positioning block 25. The LED lamp group 3 is at least provided with a plurality of wires, and positive and negative poles of the plurality of wires are distinguished. The positive and negative wires of the LED lamp group 3 pass through the two wire holes 23, respectively, and are electrically connected to the electrical connection plate 4 in the accommodating cavity 22.

Figure 6:
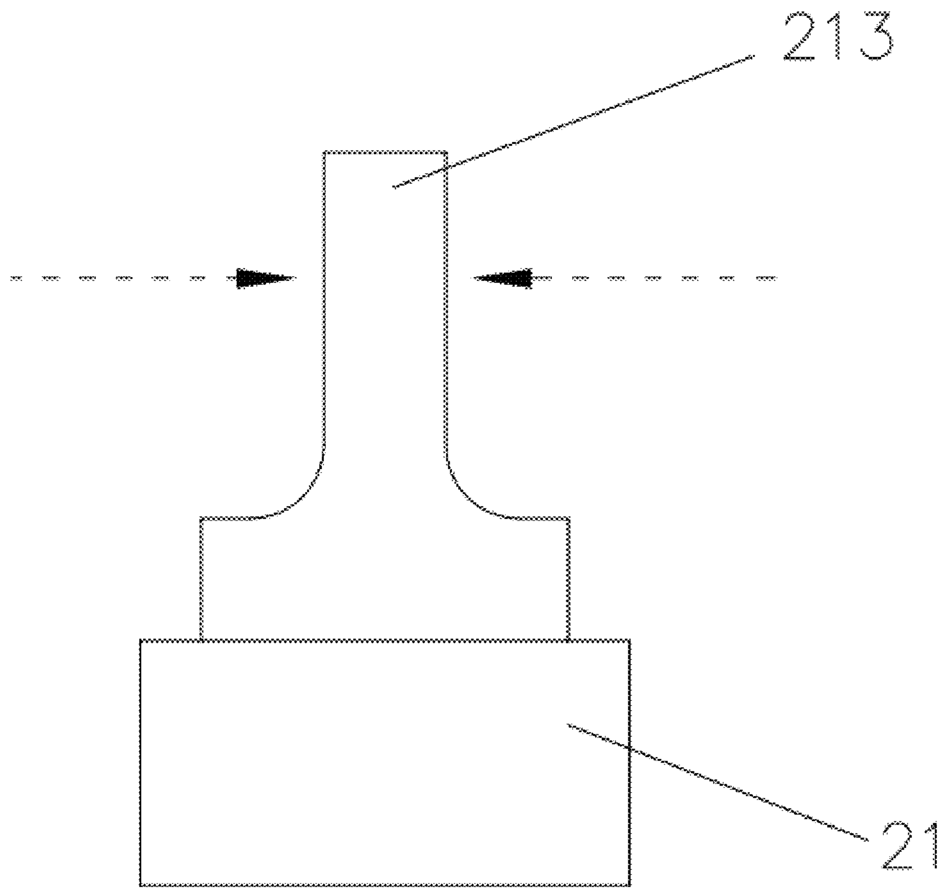
FIG. 6 shows a schematic diagram of a force bearing direction when a bump is extruded according to an embodiment of the disclosure.

The wire hole 23 is compressible to narrow, so that the wires of the LED lamp group 3 are relatively fixed with the wire hole 23. As shown in FIG. 6, the positions on both sides of the positioning block 25 corresponding to the wire holes 23 are compressed to compress the wire holes 23, such that the wires of the LED lamp group 3 are fixed relative to the wire holes 23. When the bulb is produced and assembled, the positioning block 25 is extruded to a certain degree by means of a punching device or other mechanical extrusion devices, such that the inner diameter of the wire holes 23 is reduced. The wires of the LED lamp group 3 are fixed in the wire holes 23, and the LED lamp group 3 is prevented from loosening due to continuous displacement of the wires in the wire holes 23, thereby improving the stability.

The electrical connection plate 4 is provided with the expansion capacitor 41 and the control chip 42, where the control chip 42 of the electrical connection plate 4 is an integrated chip (IC), a voltage reading module is built-in the control chip 42, and the control chip 42 is at least connected to a sampling resistor or the sampling resistor is built-in the control chip to detect a current and a voltage. The expansion capacitor 41 is a high-capacity external capacitor of the electrical connection plate 4. The electrical connection plate 4 is provided with a first wire 43 and a second wire 44 that are connected to an external power supply. The control chip 42 and the expansion capacitor 41 may adjust the output power of the LED lamp group 3 according to the amplitudes of the voltages output by the first wire 43 and the second wire 44, so as to change emission of the LED lamp group 3. Specifically, the first wire 43 and the second wire 44 are directly or indirectly connected to a voltage transformation circuit, such as a voltage controller or other circuit control devices. The control chip 42 and the expansion capacitor 41 may adjust the output power of the LED lamp group 3 according to the amplitudes of the voltages output by the first wire 43 and the second wire 44, so as to change emission of the LED lamp group 3. The bulb is mounted on the lamp holder. If the lamp holder is connected to a circuit with a constant voltage, the power output by the bulb is also constant power. If the lamp holder where the bulb is mounted has a voltage transformation function or the lamp holder is connected to a variable voltage transformation circuit, the control chip 42 may adjust the output power of the LED lamp group 3 after identifying the voltage. This structure is suitable for scenarios for centralized control of light intensity, such as residential living rooms, lobby venues, photography venues, and construction sites. Compared with the LED bulbs with the same size on the market, the output power of this bulb may be controlled in a centralized manner to change, so as to increase or decrease the illumination brightness.

A lamp base 13 is disposed outside the bayonet socket 11, and the first wire 43 and the second wire 44 are electrically connected to two electrodes of the lamp base 13, respectively. The lamp base 13 is a threaded lamp base 13 or a bayonet-type lamp base 13. The lamp base 13 is connected to the lamp holder, such that the first wire 43 and the second wire 44 are connected to the circuit to make the LED lamp group 3 emit light.

The bulb shell 1 is filled with inert gas. Preferably, the inert gas in this solution is helium. The bulb shell 1 is filled with helium to play a heat dissipation role and further prevent fogging inside the bulb shell 1 to ensure the light transmittance of the bulb shell 1, thereby further improving the luminous brightness of the bulb.

A threaded portion 12 is disposed outside the bayonet socket 11, and the plug socket 21 is provided with a step portion 24 abutting against a port of the bayonet socket 11. In special usage scenarios, such as a plurality of bulbs connected in series or in parallel, used as a light string, the first wire 43 and the second wire 44 may be connected to a circuit of the light string, and then the bulb shell 1 is screw-mounted on the lamp holder of the light string, such that the bulb may be mounted and fixed without a metal lamp base 13. Limited by the step portion 24 and the port of the bayonet socket 11, the other side of the step portion 24 abuts against the lamp holder on a wire of the light string to fix the light-emitting assembly 2. The plug socket 21 is tightly connected to the bayonet socket 11 to prevent water vapor from entering the bulb shell 1 from the gap of the bayonet socket 11, thereby further improving the waterproof performance.

The LED lamp group 3 is provided with a plurality of LED light bars 31 and a third wire 32 and a fourth wire 33 that are connected to the light bars, the third wire 32 passes through the wire hole 23 and is electrically connected to the electrical connection plate 4, the fourth wire 33 is connected in parallel to the plurality of LED light bars 31, and a wiring groove 212 capable of positioning the fourth wire 33 is formed in a tail end of the stem 211. Both ends of each of the LED light bars 31 approach the tail end of the stem 211 and the plug socket 21, respectively. The fourth wire 33 is used for electrical connection between the LED light bars 31, such that the plurality of LED light bars 31 are connected in series. At least two third wires 32 are disposed and pass through the wire holes 23 at different positions, respectively. The two third wires 32 are connected to the electrical connection plate 4 to form the positive and negative circuits of the LED lamp group 3. Combined light emission of the plurality of LED light bars 31 may increase the luminous brightness, reduce the bearing capacity of a single LED light bar 31, avoid overcurrent or overheating of the LED light bars 31, and prolong the service life.

A protruding bump 213 is disposed at the tail end of the stem 211, and the bump 213 is thermally deformable. Compared with glass stem holders on the market, the plug socket 21, the stem 211, and the bulb shell 1 in the present disclosure are all made of plastic materials, which are small in weight, low in cost, and shock and impact-resistant. When the bulb is produced and assembled, after the fourth wire 33 is placed in the wiring groove 212, the bump 213 is hot-melted to a small extent by using a high-temperature tool, and after part of the bump 213 is melted and deformed, the wiring groove 212 is blocked or filled to fix the fourth wire 33, so as to fix the LED lamp group 3. Production and assembly are facilitated.

As another embodiment of the LED lamp group 3, further, two groups of the LED lamp groups 3 are disposed, each group of the LED lamp groups 3 is provided with two LED light bars 31, a third wire 32 that is connected to the electrical connection plate 4 is disposed at one end of each of the LED light bars 31, and a fourth wire 33 that electrically connect the two LED light bars 31 is disposed at the other end of each of the LED light bars 31. A wire connection structure of the LED lamp group 3 is as follows: one end of an LED light bar 31 is connected to a third wire 32 and one end of another LED light bar 31 is connected to the other third wire 32. The other ends of the two LED lamp bars 31 are connected via the fourth wire 33. In this structure, the two third wires 32 of the first group of LED lamp group 3 electrically abut against the two third wires 32 of the second group of LED lamp group 3, respectively. After the two third wires 32 of the first group of LED lamp group 3 are electrically connected to the electrical connection plate 4, the second group of LED lamp group 3 may also be electrified.

Figure 3:
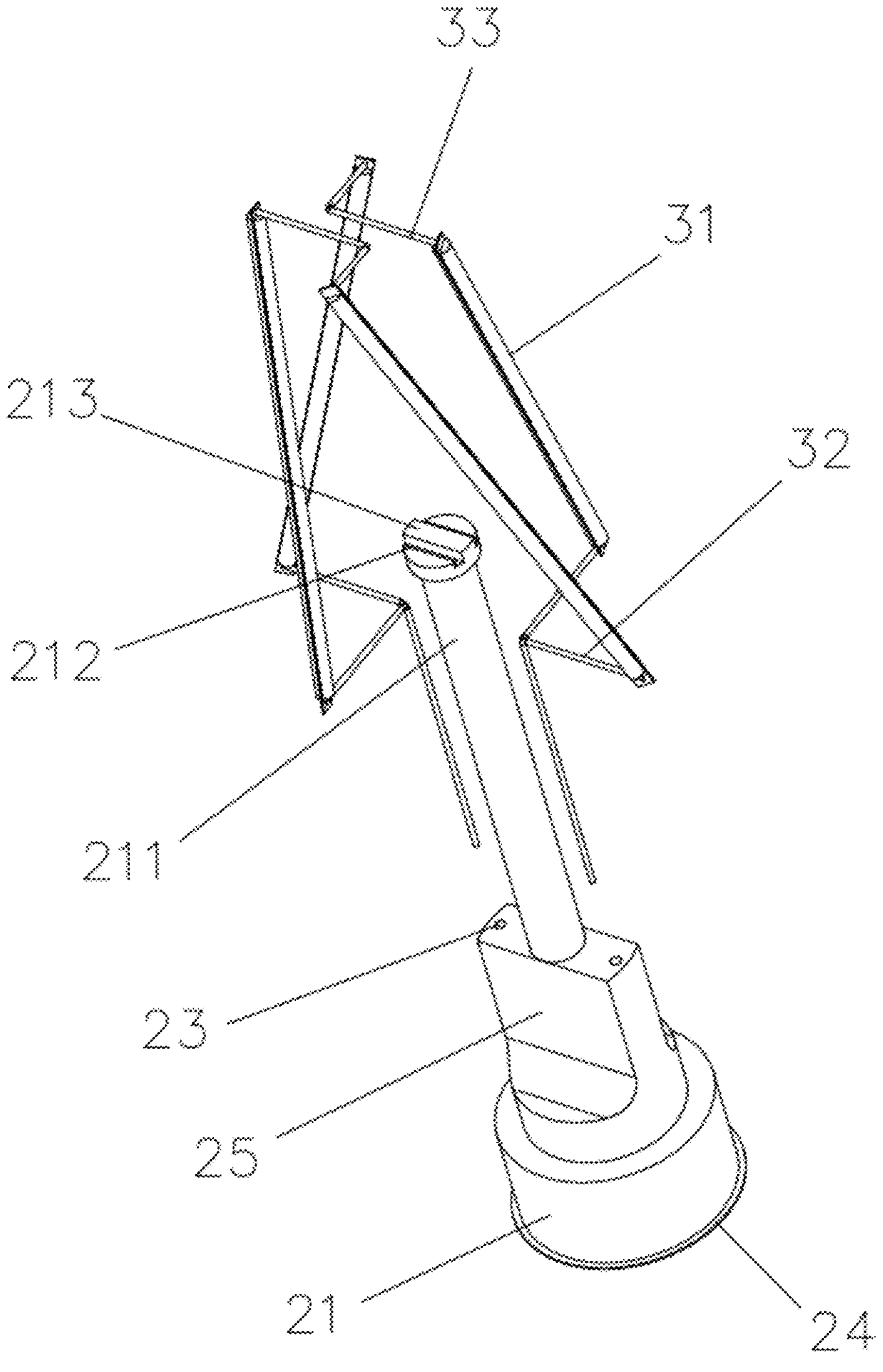
FIG. 3 shows a partial exploded schematic structural diagram of a light-emitting assembly according to an embodiment of the disclosure.
Figure 4:
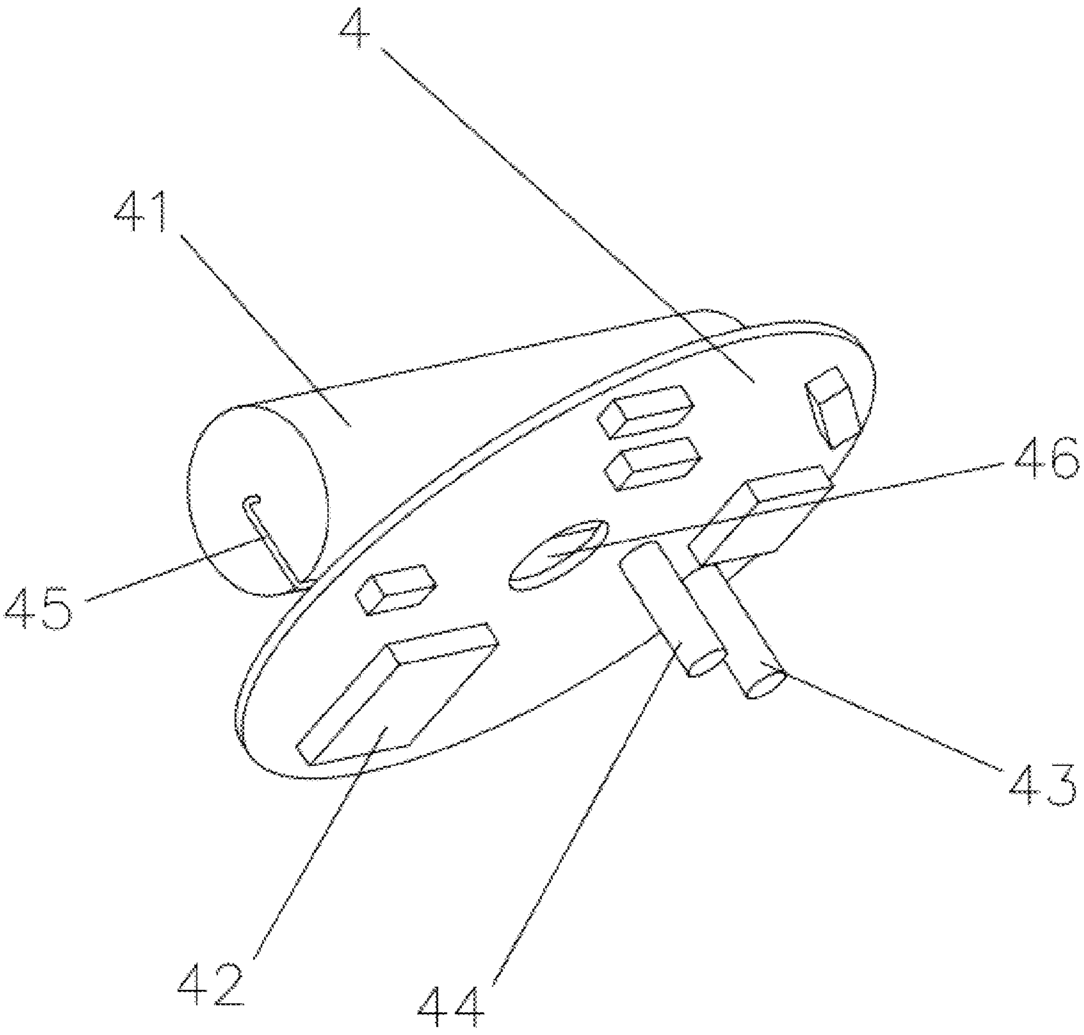
FIG. 4 shows a reference structural diagram of an electrical connection plate according to an embodiment of the disclosure.
Figure 5:
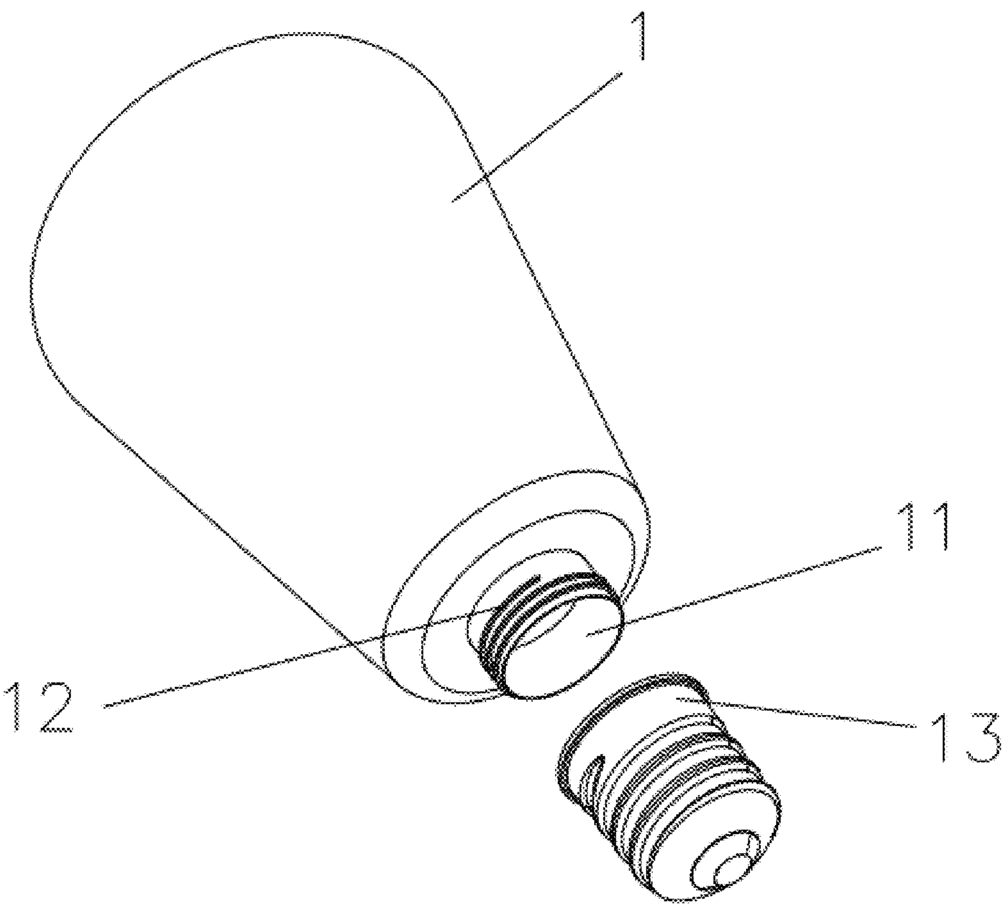
FIG. 5 shows a schematic structural diagram of a bulb shell according to an embodiment of the disclosure.

The LED lamp group 3 is provided with a plurality of LED light bars 31, the LED light bars 31 are disposed around the stem 211 at equal intervals, and relative to the stem 211, each of the LED light bars 31 is obliquely disposed. Referring to FIG. 3, two groups of LED lamp groups are disposed. Two wiring grooves 212 are disposed. The fourth wires 33 of each of the LED lamp groups 3 are fixed in different wiring grooves 212, respectively. The fourth wires 33 are bent. The third wires 32 are bent after passing through the wire holes 23. The bent part of each of the third wires 32 and the corresponding end of each of the fourth wires 33 form a left-right dislocation, and the relative included angle therebetween is in the range of 20° to 90°. In this structure, the LED light bars 31 are inclined, and viewed from the side of the bulb, the plurality of LED light bars 31 intersect with each other, such that when the LED light bars 31 emit light, the influence of light being blocked by other LED light bars 31 is greatly reduced, thereby increasing the brightness of the bulb. This bulb at the same power has a higher brightness. For example, the brightness of the conventional LED bulbs on the market is usually 400-800 lumens when the power is 6 watts. The brightness of this bulb may reach 800-1,100 lumens when the power is 6 watts. Event connected to a circuit with a constant voltage, this bulb also has a higher brightness, such that the application range is expanded, and this bulb may be used in places such as a wide site.

Further, the expansion capacitor 41 is disposed on an upper side surface of the electrical connection plate 4, a support wire 45 is disposed between the expansion capacitor and the electrical connection plate 4, and the control chip 42 is disposed on a lower side surface of the electrical connection plate 4. The expansion capacitor 41 is an external capacitor. During use, the expansion capacitor generates heat. In this solution, the support wire 45 is a rigid electrical connection wire, which may not only be used for the electrical connection of the expansion capacitor 41 and the electrical connection plate 4, but also support the expansion capacitor 41, such that a gap exists between the expansion capacitor 41 and the electrical connection plate 4 to prevent the expansion capacitor 41 from being in direct contact with the electrical connection plate 4.

The above content is merely a preferred embodiment of the disclosure. For those skilled in the art, modifications may be made to the specific implementation modes and application scope in accordance with the concept of the disclosure. The content of this specification shall not be construed as a limitation on the disclosure.

Various embodiments of the disclosure may have one or more of the following effects. In some embodiments, the sealed and waterproof high-power shock-resistant bulb, provided by the disclosure may include the bulb and the light-emitting assembly, where the bulb shell is made of a plastic material and is provided with a bayonet socket; the light-emitting assembly is provided with the plug socket and the LED lamp group, where the plug socket is capable of being connected to the bayonet socket and is provided with the accommodating cavity, and the electrical connection plate is disposed in the accommodating cavity; the electrical connection plate is provided with the expansion capacitor and the control chip, the electrical connection plate is provided with the first wire and the second wire that are connected to an external power supply. In other embodiments, the disclosure has the following advantages: 1, by additionally disposing the expansion capacitor in the bulb, the light-emitting assembly may change the light-emitting power of a light-emitting diode (LED) lamp group according to an input voltage; 2, the LED lamp group is composed of a plurality of obliquely dislocated LED light bars, such that the bulb may generate a luminous brightness with higher lumens; and 3, the bulb and a plug socket are both made of a plastic material, such that the sealed and waterproof high-power shock-resistant bulb is low in manufacturing cost, good in sealing effect, and waterproof and shock-resistant. In further embodiments, the present disclosure may provide a sealed and waterproof high-power shock-resistant bulb, which may have the advantages of being variable in power, waterproof, and shock-resistant.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A sealed and waterproof high-power shock-resistant bulb, comprising a bulb shell (1) and a light-emitting assembly (2), wherein:

the bulb shell (1) is made of a plastic material and is provided with a bayonet socket (11);

the light-emitting assembly (2) is provided with a plug socket (21) and an LED lamp group (3), wherein:

a stem (211) configured to be placed in the bulb shell (1) is disposed at a front end of the plug socket (21), the LED lamp group (3) is fixedly connected to the stem (211), a rear end of the plug socket (21) is configured to be connected to the bayonet socket (11) and is provided with an accommodating cavity (22), an electrical connection plate (4) is disposed in the accommodating cavity (22), and a sealant groove (221) is reserved in the accommodating cavity (22), and the sealant groove (221) is filled with a sealant, such that the electrical connection plate (4) is hermetically isolated from outside;

the plug socket (21) is provided with a wire hole (23) configured to accommodate a plurality of wires, and a wire of the LED lamp group (3) is electrically connected to the electrical connection plate (4) via the wire hole (23); and the electrical connection plate (4) is provided with an expansion capacitor (41) and a control chip (42), the electrical connection plate (4) is provided with a first wire (43) and a second wire (44) that are connected to an external power supply, and the control chip (42) and the expansion capacitor (41) are configured to adjust output power of the LED lamp group (3) according to magnitudes of voltages output by the first wire (43) and the second wire (44), so as to change light emission of the LED lamp group (3).

2. The sealed and waterproof high-power shock-resistant bulb according to claim 1, wherein:

a lamp base (13) is disposed outside the bayonet socket (11); and the first wire (43) and the second wire (44) are electrically connected to two electrodes of the lamp base (13), respectively.

3. The sealed and waterproof high-power shock-resistant bulb according to claim 1, wherein the bulb shell is filled with inert gas.

4. The sealed and waterproof high-power shock-resistant bulb according to claim 1, wherein:

the LED lamp group (3) is provided with a plurality of LED light bars (31) and a third wire (32) and a fourth wire (33) that are connected to the light bars, the third wire (32) passes through the wire hole (23) and is electrically connected to the electrical connection plate (4), the fourth wire (33) is connected in series to the plurality of LED light bars (31), and a wiring groove (212) capable of positioning the fourth wire (33) is formed in a tail end of the stem (211).

5. The sealed and waterproof high-power shock-resistant bulb according to claim 1, wherein:

a protruding bump (213) is disposed at a tail end of the stem (211); and the bump (213) is thermally deformable.

6. The sealed and waterproof high-power shock-resistant bulb according to claim 1, wherein:

the light-emitting assembly (2) is provided with two groups of the LED lamp groups (3);

each group of the LED lamp groups (3) is provided with two LED light bars (31);

a third wire (32) that is connected to the electrical connection plate (4) is disposed at one end of each of the LED light bars (31); and a fourth wire (33) that electrically connect the two LED light bars (31) is disposed at another end of each of the LED light bars (31).

7. The sealed and waterproof high-power shock-resistant bulb according to claim 1, wherein:

the plug socket (21) is provided with a positioning block (25); and two wire holes (23) are formed and penetrate through the positioning block (25).

8. The sealed and waterproof high-power shock-resistant bulb according to claim 1, wherein:

the LED lamp group (3) is provided with a plurality of LED light bars (31);

the LED light bars (31) are disposed around the stem (211) at equal intervals; and each of the LED light bars (31) is obliquely disposed relative to the stem (211).

9. The sealed and waterproof high-power shock-resistant bulb according to claim 1, wherein the wire hole (23) is compressible to be narrowed so that the wires of the LED lamp group (3) are fixed with the wire hole (23).

10. The sealed and waterproof high-power shock-resistant bulb according to claim 1, wherein:

the expansion capacitor (41) is disposed on an upper side surface of the electrical connection plate (4);

a support wire (45) is disposed between the expansion capacitor and the electrical connection plate (4); and the control chip (42) is disposed on a lower side surface of the electrical connection plate (4).

* * * * *